US008879989B2

(12) United States Patent
McRae

(10) Patent No.: US 8,879,989 B2
(45) Date of Patent: Nov. 4, 2014

(54) SYSTEM, METHOD AND APPARATUS FOR DISPLAYING CALLER-IDENTIFICATION

(75) Inventor: Matthew Blake McRae, Laguna Beach, CA (US)

(73) Assignee: Vizio Inc., Irvine, CA (US)

( * ) Notice: Subject to any disclaimer, the term of this patent is extended or adjusted under 35 U.S.C. 154(b) by 704 days.

(21) Appl. No.: 12/716,293

(22) Filed: Mar. 3, 2010

(65) Prior Publication Data

US 2011/0217928 A1 Sep. 8, 2011

(51) Int. Cl.
*H04B 7/00* (2006.01)
*H04N 7/025* (2006.01)
*H04M 15/06* (2006.01)

(52) U.S. Cl.
CPC ............. *H04B 7/00* (2013.01); *H04N 7/025* (2013.01); *H04M 15/06* (2013.01)
USPC ........ 455/41.2; 455/33.1; 455/88; 455/552.1; 455/557; 455/415; 455/417; 455/420; 455/466; 455/462; 370/401; 370/352; 370/485; 370/395.1; 370/522; 379/59; 379/96; 379/100; 379/444; 379/353

(58) Field of Classification Search
USPC .......... 455/41.2, 603, 556.1, 552.1, 551, 415, 455/41.1; 379/93.31, 93.05, 22.01, 22.02, 379/21, 256, 142.16, 265.02; 370/352, 254, 370/328, 401, 395.1, 468
See application file for complete search history.

(56) References Cited

U.S. PATENT DOCUMENTS

| | | | | |
|---|---|---|---|---|
| 4,356,509 | A * | 10/1982 | Skerlos et al. | 348/552 |
| 5,343,516 | A * | 8/1994 | Callele et al. | 379/93.05 |
| 5,349,638 | A * | 9/1994 | Pitroda et al. | 379/142.16 |
| 6,122,526 | A * | 9/2000 | Parulski et al. | 455/556.1 |
| 6,141,058 | A * | 10/2000 | Lagoni et al. | 348/563 |
| 7,580,005 | B1 * | 8/2009 | Palin | 345/1.1 |
| 7,672,444 | B2 * | 3/2010 | Perrella et al. | 379/265.02 |
| 8,238,354 | B2 * | 8/2012 | Bossemeyer et al. | 370/401 |
| 2003/0027559 | A1 * | 2/2003 | Umstetter et al. | 455/415 |
| 2003/0142796 | A1 * | 7/2003 | Ames, Jr. | 379/88.04 |
| 2006/0116114 | A1 * | 6/2006 | Kadado | 455/415 |
| 2008/0260125 | A1 * | 10/2008 | Barnes et al. | 379/142.04 |
| 2011/0211584 | A1 * | 9/2011 | Mahmoud | 370/401 |

* cited by examiner

*Primary Examiner* — Ganiyu A Hanidu
(74) *Attorney, Agent, or Firm* — Law Office of Scott C. Harris, Inc.

(57) ABSTRACT

An application for a caller-identification system includes a circuit for receiving caller-identification information from a tip and ring interface and a circuit for wirelessly transmitting at least a subset of the caller-identification information to a display system. In the display system includes a circuit for receiving the caller-identification information and a circuit for displaying the caller-identification information on a display.

11 Claims, 4 Drawing Sheets

SYSTEM, METHOD AND APPARATUS FOR DISPLAYING CALLER-IDENTIFICATION

FIELD

This invention relates to the field of television systems and more particularly to a system for presenting caller-identification on a display screen.

BACKGROUND

Starting in the early 1980s, caller-identification signals, also known as caller-id, have been transferred from phone systems (e.g. Plain Old Telephone Service or POTS) to station equipment (e.g. land-based telephones). There are/were several versions and standards of caller-identification throughout the world. Currently, in the United States, the caller-identification information (e.g. calling number and calling name, if available) are transmitted to a subscriber's station equipment (e.g. phone) during the interval between the first ring and the second ring. The calling party's information is transferred through the phone system on a signaling plan called SS7 (Signaling System 7) until it reaches the subscriber's provider phone switch where it is encoded in either Single Data Message Format (SDMF), which provides the caller's telephone number and the date and time of the call or Multiple Data Message Format (MDMF) which provides the caller's name, telephone number and the date and time of the call. The data is modulated using, for example, a modulation technique similar to the Bell 202 standard used for early modems.

A similar system and signaling plan is implemented by cable-based phone systems such as Voice Over Internet Protocol (VoIP), although the information is signaled throughout the network differently, the same signaling methods are used between the phone/cable Analog Phone Adapter (APA) and the station equipment (phone) in order to permit attachment of legacy phones to an RJ-11 jack of the Analog Phone Adapter.

Of further interest is the actual ring system used by phone systems. Phone systems signal ringing with a high-voltage pulsed DC or AC signal. In North America, the high-voltage signal is around 90 volts at 20 Hz while in Europe, the high-voltage signal is 60-90 volts at 25 Hz. In North America, the cadence is 2-4, or two seconds of ring voltage followed by four seconds of silence. It is possible to use the ring signal for powering a device by charging a capacitor or similar charge device during the ring interval then using power from the capacitor to power other circuitry.

The caller-identification and ring signal are transferred from the phone system or APA though a two-wire interface known as Tip and Ring, usually through cabling connected with a standard phone plug/jack known as RJ-11. Station equipment such as phones, computers, televisions that are directly connected to the Tip and Ring are able to receive the caller-identification and ring signals and use them to initiate a ring sound and/or display the caller information on a display. Such station equipment was required to be directly connected to the Tip and Ring interface.

What is needed is a system that will capture the caller-identification information from the Tip and Ring and transfer the caller-identification information to a system such as a television where it is displayed.

SUMMARY

In one embodiment, a caller-identification system is disclosed including a circuit for receiving caller-identification information from a tip and ring interface and a circuit for wirelessly transmitting at least a subset of the caller-identification information to a display system. In the display system is a circuit for receiving the caller-identification information and a circuit for displaying the caller-identification information on a display.

In another embodiment, method of displaying caller-identification is disclosed including receiving caller-identification information from a tip and ring interface and transmitting at least a subset of the caller-identification information over a wireless arrangement then receiving the at least a subset of the caller-identification information at a display system and displaying the at least a subset of the caller-identification information at the display system.

In another embodiment, caller-identification system is disclosed including a caller-identification line interface circuit interfaced to a tip and ring interface that decodes caller-identification information from the tip and ring interface. A controller is interfaced to the caller-identification line interface circuit and accepts the caller-identification information. A wireless transmitter is interfaced to the controller and accepts the caller-identification information from the controller and transmitting the caller-identification information. A wireless receiver is interfaced to a display system and receives the caller-identification information from the wireless transmitter and transfers the caller-identification information to a processing element where it is formatted into a display message which is presented on a display interfaced to the processing element.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
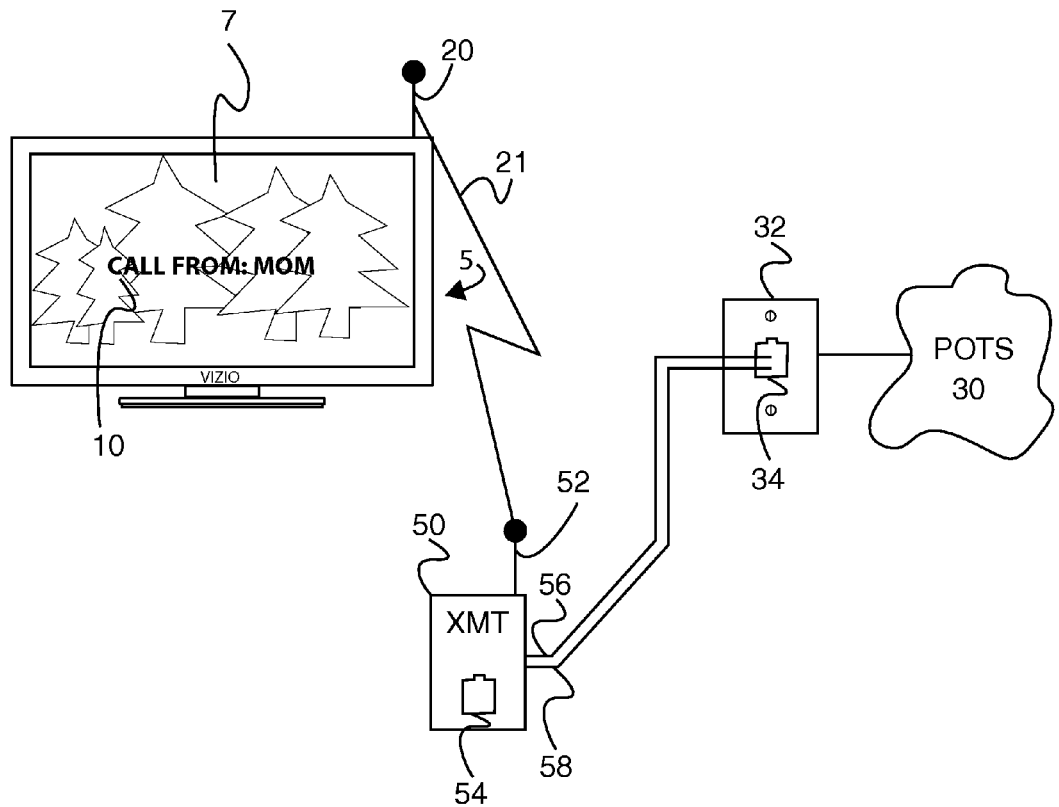
FIG. 1 illustrates a plan view of a television interfaced to a phone system through a wireless interface.

Reference will now be made in detail to the presently preferred embodiments of the invention, examples of which are illustrated in the accompanying drawings. Throughout the following detailed description, the same reference numerals refer to the same elements in all figures. Throughout the description, the term transmitter and receiver are either independent transmitters or receivers and/or are the transmitter section/receiver section of a transceiver.

Referring to FIG. 1, a plan view of a television interfaced to a phone system through a wireless interface is described. Caller-identification information (e.g. calling number and calling name) are transmitted to a subscriber's station equipment (in this example a wireless transmitter 54) during the interval between the first ring and the second ring from, for example, the phone system 30 over a two-wire tip and ring interface 56/58. The calling party's information is transferred through the phone system on a signaling plan called SS7 (Signaling System 7) until it reaches the subscriber's provider phone switch where it is encoded in either Single Data Message Format (SDMF), which provides the caller's telephone number and the date and time of the call or Multiple Data Message Format (MDMF) which provides the caller's name, telephone number and the date and time of the call. The data is modulated using, for example, a modulation technique similar to the Bell 202 standard used for early modems and sent to the subscriber's equipment over the tip and ring, two-wire interface 56/58. For many home connection systems, standard RJ-11 connection systems are used such as an RJ-11 plug 34 and an RJ-11 wall jack 32 that connects to the home network of phone lines and eventually to the local phone switch (Plain Old Telephone Service—POTS) 30.

The transmitter 50 demodulates the caller-identification information and transmits part or all of the caller-identification information over a wireless signal 21 from an internal or external antenna 52. The caller-identification information is received at a remote device such as a television 5 through an antenna 20, decoded (see FIG. 4) and displayed as a message 10 on a display 7. In some embodiments, the message 10 is a pop-up message, in some embodiments; the message 10 is an overlay message. Any form of message, including a spoken message (e.g., text-to-speech) is anticipated. In some embodiments, the remote device (e.g. television) contains a translation table that is used to translate some or all of the caller-identification information into one or more words of the display message 10. For example, a exemplary caller-identification message includes an originating phone number (201-555-1212) and an originating name (e.g. Hilary Clinton) and the processing element 100 (see FIG. 4) accesses a translation table (not shown) that has a translation between 201-555-1212 and "Mom", the display message 10 will then be "Call from Mom."

Although a television 5 is shown as the receiving device, any other reception device is anticipated including a stand-alone device that receives the wireless signal 21 and displays the caller-identification information on a dedicated display or a display that is used for other purposes such as displaying the time or current temperature, etc.

Any wireless transmission arrangement is anticipated including, but not limited to, Bluetooth, WiFi (e.g. 802.11), infrared, proprietary wireless, etc, although Bluetooth is preferred due to its popularity in consumer electronic devices such as televisions 5, etc. In as much as an arrangement such as Bluetooth is used for the wireless transmission and Bluetooth, for example, enables multiple-device communications, it is anticipated that other devices also send information for display on the, for example, television 5. For example, it is anticipated that a cellular phone also send caller-identification information over, for example, Bluetooth to the, for example, television 5 for display on the display 7. Likewise, it is anticipated that a washer or dryer send a status message in the same way (e.g. cloths are ready) or a smart oven send a status message (e.g. cooking temperature reached), etc. Having the wireless reception and message display provides additional capabilities not previously available.

In some embodiments, a pass-through RJ-11 jack (or other connector) 54 is provided for connection to other devices that, prior to insertion of the transmitter 50, were connected to the existing RJ-11 jack 34.

Figure 2:
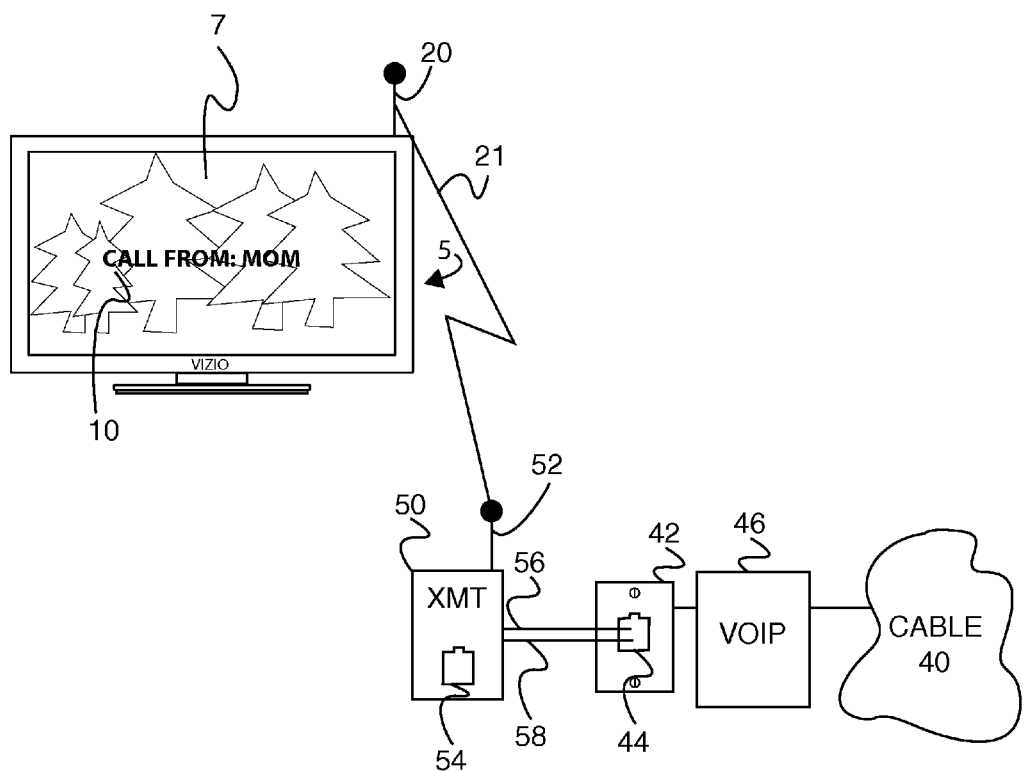
FIG. 2 illustrates a plan view of a television interfaced to a second phone system through a wireless interface.

Referring to FIG. 2, a plan view of a television interfaced to a second phone system through a wireless interface is described. As in FIG. 1, Caller-identification information (e.g. calling number and calling name) are transmitted to a subscriber's station equipment (in this example a wireless transmitter 50) during the interval between the first ring and the second ring from, for example, the cable or fiber Analog Phone Adapter (ATA) over a two-wire tip and ring interface 56/58. The calling party's information is transferred through the internet until it reaches the subscriber's modem and Analog Phone Adapter where it is encoded in either Single Data Message Format (SDMF), which provides the caller's telephone number and the date and time of the call or Multiple Data Message Format (MDMF) which provides the caller's name, telephone number and the date and time of the call. The data is modulated using, for example, a modulation technique similar to the Bell 202 standard used for early modems and sent to the subscriber's equipment over the tip and ring, two-wire interface 56/58. For many home connection systems, standard RJ-11 connection systems are used such as an RJ-11 plug 34 and an RJ-11 wall jack 32 that connects to the home network of phone lines and eventually to the local phone switch 30.

The transmitter 50 demodulates the caller-identification information and transmits the caller-identification information over a wireless signal 21 from an internal or external antenna 52. The caller-identification information is received at a remote device such as a television 5 through an antenna 20, decoded (see FIG. 4) and displayed as a message 10 on a display 7. In some embodiments, the message 10 is a pop-up message, in some embodiments; the message 10 is an overlay message. Any form of message, including a spoken message (e.g., text-to-speech) is anticipated. In some embodiments, the remote device (e.g. television) contains a translation table that is used to translate some or all of the caller-identification information into one or more words of the display message 10. For example, a exemplary caller-identification message includes an originating phone number (201-555-1212) and an originating name (e.g. Hilary Clinton) and the processing element 100 (see FIG. 4) accesses a translation table (not shown) that has a translation between 201-555-1212 and "Mom", the display message 10 will then be "Call from Mom."

Although a television 5 is shown as the receiving device, any other reception device is anticipated including a stand-alone device that receives the wireless signal 21 and displays the caller-identification information on a dedicated display or a display that is used for other purposes such as displaying the time or current temperature, etc.

Any wireless transmission arrangement is anticipated including, but not limited to, Bluetooth, WiFi (e.g. 802.11), infrared, proprietary wireless, etc, although Bluetooth is preferred due to its popularity in consumer electronic devices such as televisions, etc. In as much as an arrangement such as Bluetooth is used for the wireless transmission and Bluetooth, for example, enables multiple-device communications, it is anticipated that other devices also send information for display to the, for example, television 5. For example, it is anticipated that a cellular phone also send caller-identification information over, for example, Bluetooth to the, for example, television 5 for display on the display 7. Likewise, it is anticipated that a washer or dryer send a status message in the same way (e.g. cloths are ready) or a smart oven send a status message (e.g. cooking temperature reached), etc. Having the wireless reception and message display provides additional capabilities not previously available.

Figure 3:
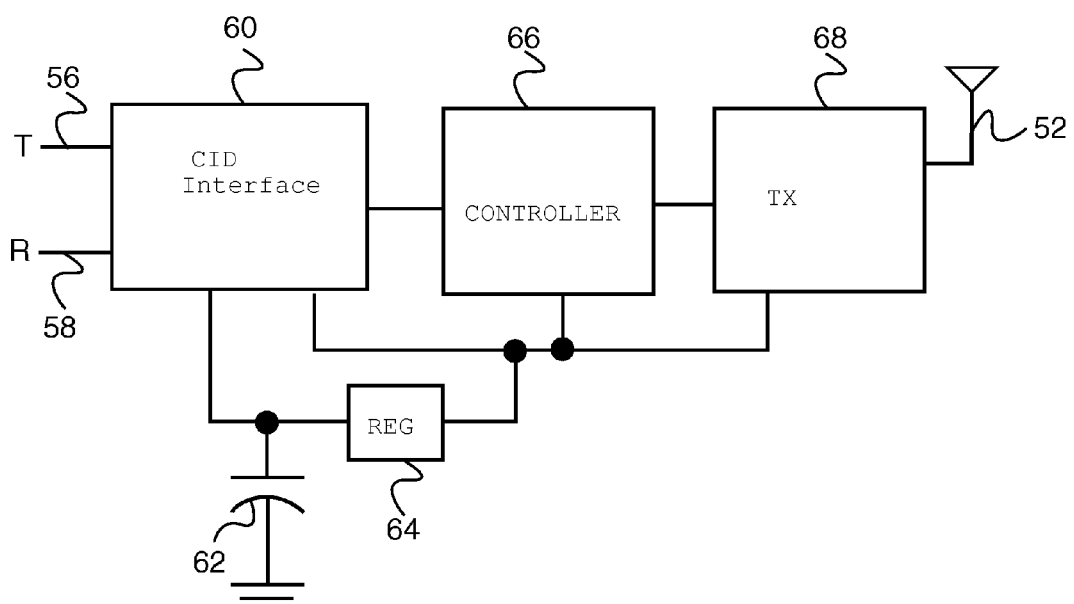
FIG. 3 illustrates a schematic diagram of a typical transmitter circuit of the present system.

Referring to FIG. 3, a schematic diagram of a typical transmitter circuit of the present system is described. Caller-identification information (e.g. calling number and calling name) are transmitted to a subscriber's station equipment (in this example a wireless transmitter 54) during the interval between the first ring and the second ring from, for example, the cable Analog Phone Adapter (ATA) 40 or phone switch 30 over a two-wire tip and ring interface 56/58. For examples using POTS 30 phone systems, the caller-identification information is transferred through the phone system (POTS) 30 until it reaches the subscriber's station equipment (e.g.) phone, or in this example, transmitting device 50. For examples using internet phones (VoIP) 40 the caller-identification information is transferred through the Internet until it reaches the subscriber's modem and Analog Phone Adapter where it is encoded into either Single Data Message Format (SDMF), which provides the caller's telephone number and the date and time of the call or Multiple Data Message Format (MDMF) which provides the caller's name, telephone number and the date and time of the call. The data is modulated using, for example, a modulation technique similar to the Bell 202 standard used for early modems and sent to the subscriber's equipment (e.g. transmitter 50 and other phones) over the tip and ring, two-wire interface 56/58. For many home connection systems, standard RJ-11 connection systems are used such as an RJ-11 plug 34 and an RJ-11 wall jack 32 that connects to the home network of phone lines and eventually to the local phone switch 30, although any connection arrangement is anticipated.

In this exemplary transmitter 50, a caller-identification information line interface 60 demodulates the caller-identification information. The information is passed to a controller 66 and the controller 66 instructs a transmitter 68 to transmit the caller-identification information over a wireless signal 21 from an internal or external antenna 52. Note that for some wireless arrangements, the transmitter 68 is actually a transceiver 68 and the transmission arrangement is two-way (either half-duplex or full-duplex) having a protocol that provides connection and/or connectionless layers as in the Bluetooth arrangement. For example, the transmitter (transceiver) 68 and equivalent transceiver 120 (see FIG. 4) of the receiving device first learn about each other, then send and receive messages freely over either a connection-based arrangement or a connectionless-based arrangement, as known in the industry.

Any wireless transmission arrangement is anticipated including, but not limited to, Bluetooth, WiFi (e.g. 802.11), infrared, proprietary wireless, etc, although Bluetooth is preferred due to its popularity in consumer electronic devices such as televisions, etc. In as much as an arrangement such as Bluetooth is used for the wireless transmission and Bluetooth, for example, enables multiple-device communications, it is anticipated that other devices also send information for display to the, for example, television 5. For example, it is anticipated that a cellular phone also send caller-identification information over, for example, Bluetooth to the, for example, television 5, for display on the display 7. Likewise, it is anticipated that a washer or dryer send a status message in the same way (e.g. cloths are ready) or a smart oven send a status message (e.g. cooking temperature reached), etc. Having the wireless reception and message display provides additional capabilities not previously available.

The ring system used by phone systems and cable or Fiber ATA arrangements signal ringing with a high-voltage pulsed DC or AC signal. In North America, the high-voltage signal is around 90 volts at 20 Hz while in Europe; the high-voltage signal is 60-90 volts at 25 Hz. In North America, the cadence is 2-4, or two seconds of ring voltage followed by four seconds of silence. In some embodiments, the line interface 60, controller 66 and transmitter/transceiver 68 are powered by the ring power provided on, at least, the first ring. In such, the ring voltage is used to charge a capacitor 62 during, for example, the first ring (e.g. two seconds of 90 volt pulses at 20 Hz). Voltage from the capacitor 62 is regulated by a regulator 64 to provide regulated power to the line interface 60, controller 66 and transmitter/transceiver 68. For example, the ring voltage charges the capacitor to approximately 90 volts DC and the regulator 64 converts this voltage down to 3.3 volts or 5 volts or any voltage required for powering the line interface 60, controller 66 and transmitter/transceiver 68. Any known regulator 64 is anticipated.

In some embodiments, a pass-through RJ-11 jack (or other connector) 54 is provided for connection to other devices that, prior to insertion of the transmitter 50, were connected to the existing RJ-11 jack 34.

Figure 4:
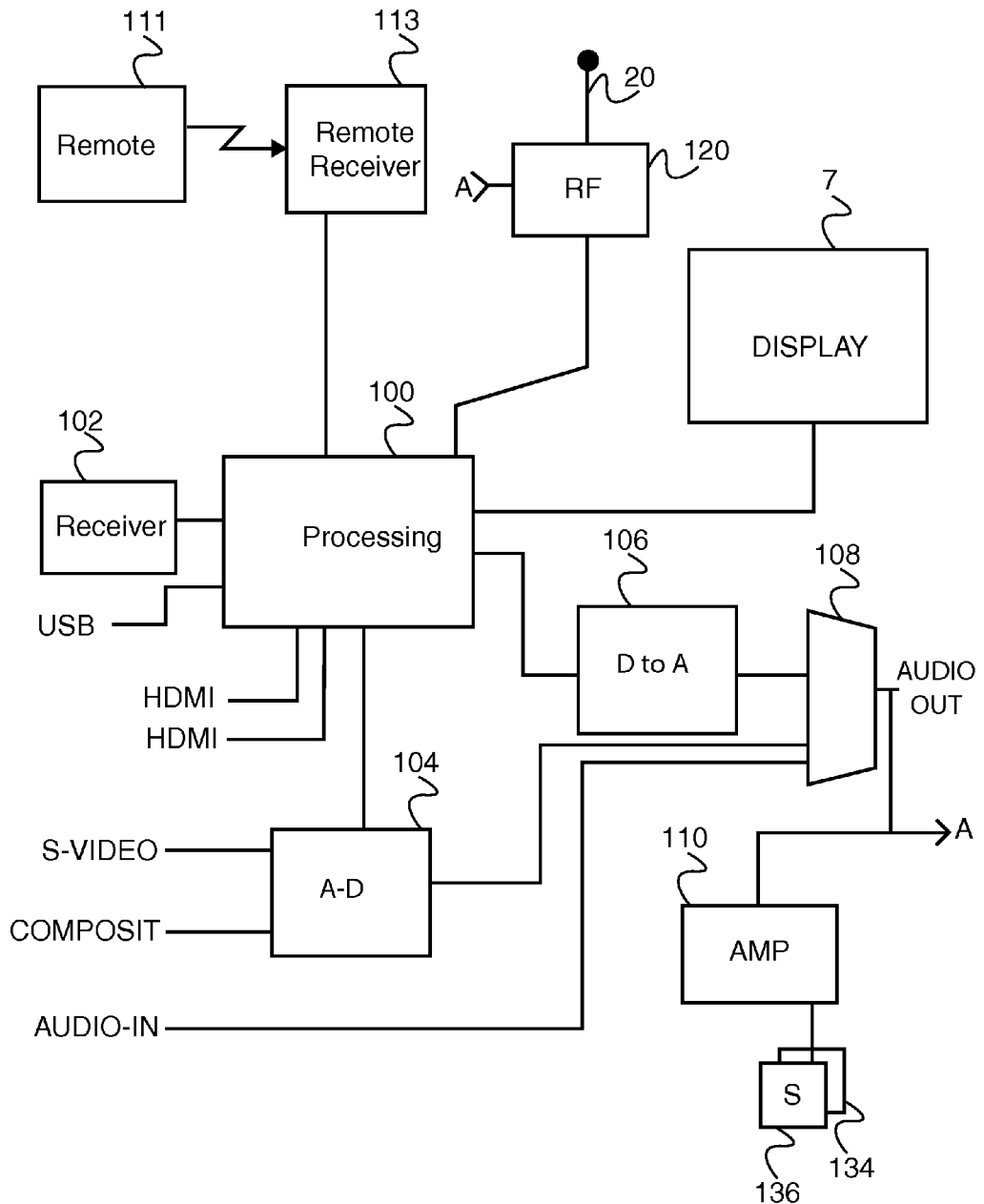
FIG. 4 illustrates a block diagram of a typical television system with wireless receiver.

Referring to FIG. 4, a schematic view of an exemplary television will be described. This figure is intended as a representative schematic of a typical monitor/television 5 and in practice, some elements are not present in some monitors/televisions 5 and/or additional elements are present in some monitors/televisions 5 as known in the industry. In this example, a display panel 7 is connected to a processing element 100. The display panel 7 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High Definition Multimedia Interface (HDMI), USB ports and an analog-to-digital converter 104. The analog-to-digital converter 104 accepts analog inputs from legacy video sources such as S-Video and Composite video and converts the analog video signal into a digital video signal before passing it to the processing element 100. The processing element 100 controls the display of the video on the display panel 7.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 134/136.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In this exemplary television, the receiver/transceiver 120 receives the caller-identification information and transfers the caller-identification information to the processing element 100. The processing element 100 formats the caller-identification information into, for example, English text and displays the text on the display 7 in any known way, including, but not limited to an overlay, pop-up, full-screen display, etc. It is anticipated that the message is displayed on the display 7 until, for example, a timer expires or a key is pressed on the remote 111.

Any form of message, including a spoken message (e.g., text-to-speech) is anticipated. In some embodiments, the remote device (e.g. television 5) contains a translation table that is used to translate some or all of the caller-identification information into one or more words of the display message 10. For example, an exemplary caller-identification message includes an originating phone number (201-555-1212) and an originating name (e.g. Hilary Clinton) and the processing element 100 accesses a translation table (not shown) that has a translation between 201-555-1212 and "Mom", the processing element then displays message 10 (e.g. "Call from Mom"). Alternately, the processing element 100 converts the text "Call from Mom" into speech and routes the speech, for example, through the D-to-A converter 160, the multiplexer 108, amplifier 110 and reproduces the speech at a speaker 134/136. Any other arrangement of text-to-speech conversion into sound waves is anticipated.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A caller-identification display system comprising:
    a display system, operating to display a first program;
    a tip and ring interface, that receives tip and ring information from a tip and ring interface of a wired telephone, said tip and ring interface having a caller ID demodulator that demodulates caller ID interface that is encoded in the tip and ring line, a controller that receives the demodulated caller ID information, and a transceiver that sends the tip and ring demodulated caller ID information wirelessly under control of the controller receiving the caller ID information;
    a wireless interface, operating over a first wireless band using a first wireless communication format, said wireless interface wirelessly receiving said tip and ring demodulated caller-identification information from the tip and ring interface of a wired telephone system using the first communication format, and said wireless interface wirelessly receiving second caller identification information directly from a cellular phone, also using the first wireless communication format;
    the display system operating for displaying both the first and the second the caller-identification information at the display system when the first and the second caller identification information are received.

2. The caller-identification system of claim 1, wherein the display system is a television.

3. The caller-identification system of claim 1, wireless interface includes a Bluetooth transceiver that receives both the first caller identification information and the second caller identification information in Bluetooth format.

4. The caller-identification system of claim 2, wherein the display system is controlled by a remote control by receiving commands from the remote control, and where the caller identification information is displayed on the display system when received until receiving a command from the remote control.

5. The caller-identification system of claim 1, further comprising a wireless receiving device, connected to wired phone lines, and receiving the caller ID information over the wireless phone lines, said wireless receiving device being powered by voltage acquired from a ring signal that precedes receipt of the caller-identification information over the tip and ring interface.

6. A method of displaying caller-identification comprising:
    demodulating caller ID that is encoded in a tip and ring interface,
    operating a controller that receives the caller ID information, to control a transceiver that sends the tip and ring demodulated caller ID information wirelessly under control of the controller receiving the caller ID information;
    wirelessly receiving caller-identification information from the tip and ring interface of the wired telephone system, from the transceiver, said wirelessly receiving being over a first wireless communication format;
    wirelessly receiving caller identification information directly from a cellular telephone, also over the first wireless communication format; and
    displaying the caller-identification information from both the wired telephone system and from the cellular telephone at the display system when the caller identification information is received.

7. The method of claim 6, wherein the display system is a television.

8. The method of claim 6, wherein the first wireless communication format transmits according to a Bluetooth standard.

9. The method of claim 6, further comprising extracting a voltage potential from a ring signal of the tip and ring interface and using the voltage potential to power the receiving caller-identification information and the transmitting.

10. The method of claim 6, further comprising controlling the display system by a remote control by receiving commands from the remote control, and displaying the caller identification information on the display system when received until receiving a command from the remote control.

11. A caller-identification display system comprising:
    a display system, operating to display a first program;
    a wireless interface, operating over a first wireless band using a first wireless communication format, said wireless interface wirelessly receiving first caller-identification information from a tip and ring interface of a wired telephone system using the first communication format and receiving second caller identification information directly from a cellular phone, also using the first wireless communication format;
    the display system operating for displaying both the first and the second the caller-identification information at the display system when the first and the second caller identification information are received,
    the display system operating for receiving commands from a remote control, and where the caller identification information is displayed on the display system when received until receiving a command from the remote control.

* * * * *